United States Patent

Brouwer

[11] 4,241,825
[45] Dec. 30, 1980

[54] PIVOTED GIMBEL BEARING FOR ROLLERS

[75] Inventor: Gerald A. Brouwer, Grandville, Mich.

[73] Assignee: Lear Siegler, Inc., Rapistan Division, Grand Rapids, Mich.

[21] Appl. No.: 34,947

[22] Filed: Apr. 30, 1979

[51] Int. Cl.³ .............................................. B65G 13/12
[52] U.S. Cl. .................................... 198/782; 198/456; 271/251; 193/35 R
[58] Field of Search ....................... 198/456, 782, 787; 271/251; 193/35 R

[56] References Cited

U.S. PATENT DOCUMENTS

| | | | |
|---|---|---|---|
| 1,989,988 | 2/1935 | Jones | 308/20 |
| 3,272,571 | 9/1966 | Ott | 308/26 |
| 3,820,860 | 6/1974 | Stone | 308/27 |
| 4,014,539 | 3/1977 | Goodwin | 271/251 |
| 4,111,412 | 9/1978 | Cathers | 198/782 |

Primary Examiner—Joseph E. Valenza
Attorney, Agent, or Firm—Price, Heneveld, Huizenga & Cooper

[57] ABSTRACT

An improvement in conveyors is disclosed in which the conveyor rollers are mounted in bearing blocks designed to pivot about a vertical axis and, thus, adjust to the angular relationship between the rollers and their supporting frame. The bearing blocks also provide a wear resisting and noise suppressing support for the roller shafts.

8 Claims, 7 Drawing Figures

U.S. Patent
Dec. 30, 1980
4,241,825
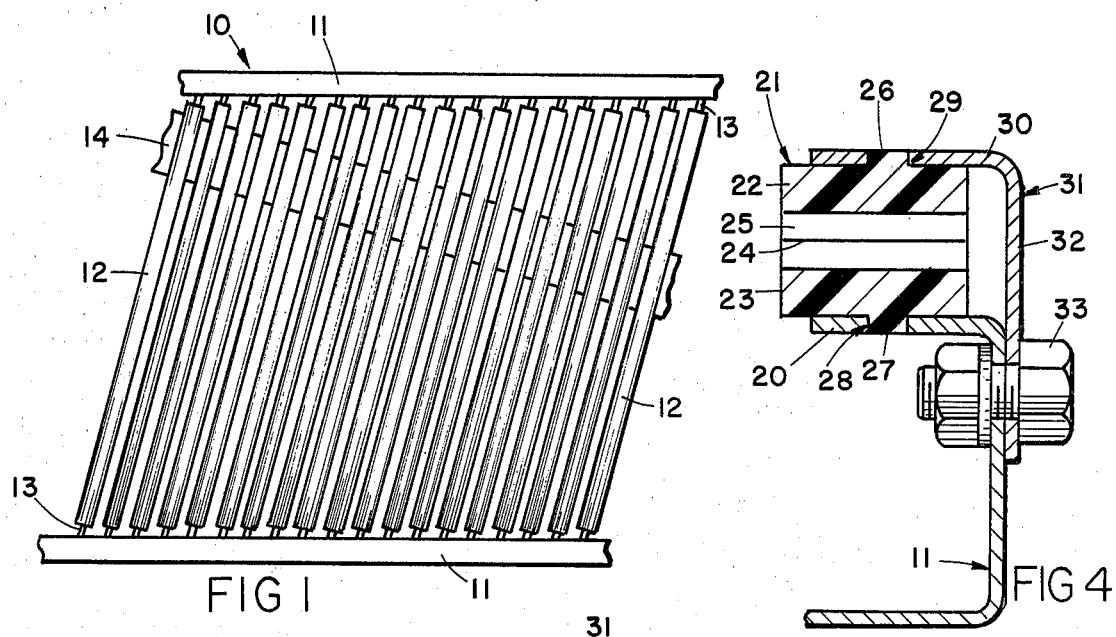
FIG 1
FIG 4
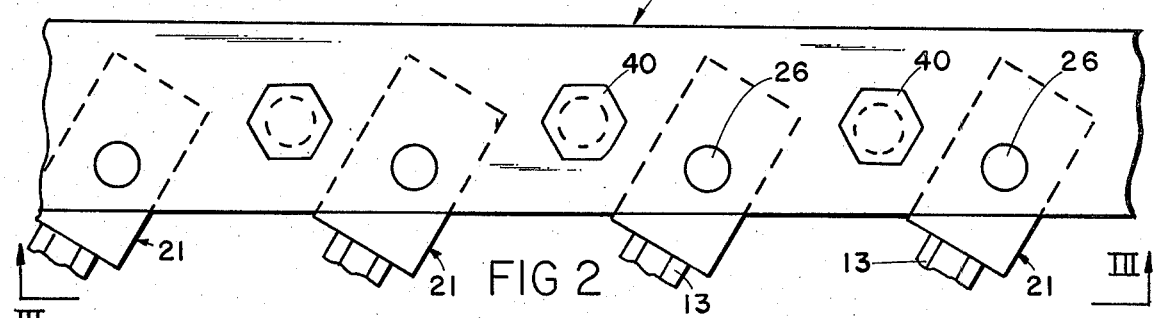
FIG 2
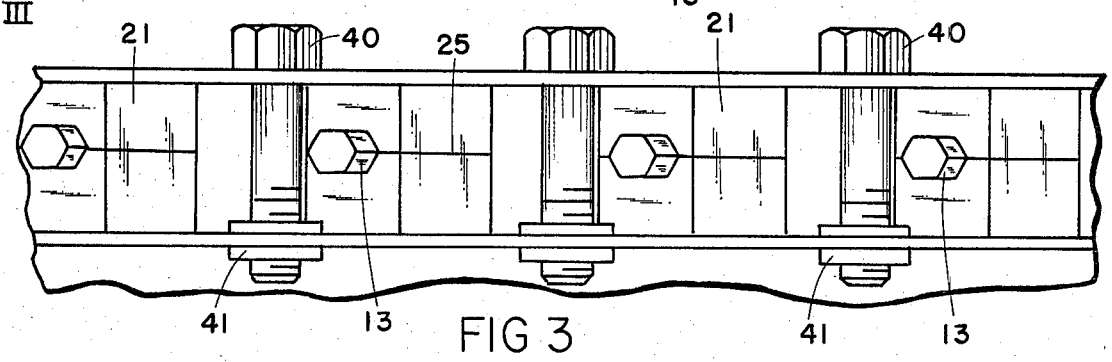
FIG 3
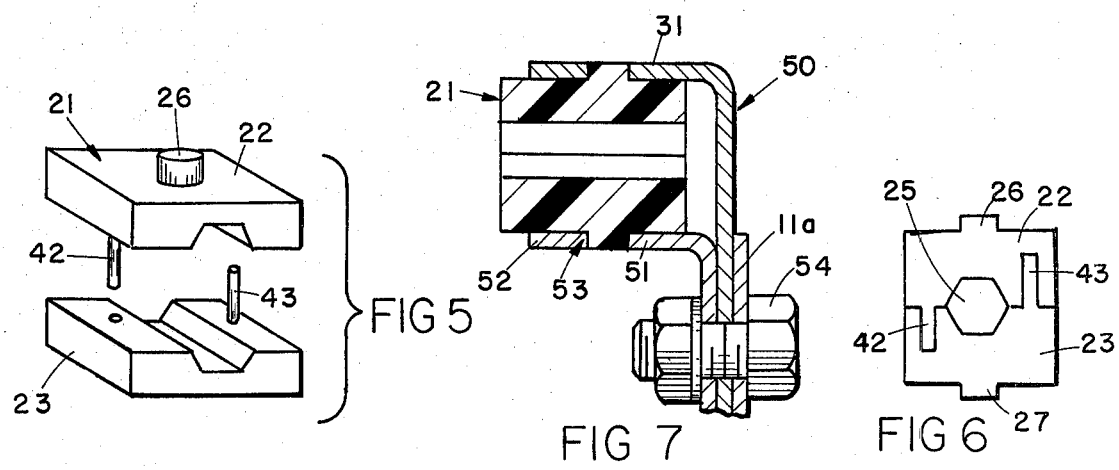
FIG 5
FIG 7
FIG 6

PIVOTED GIMBEL BEARING FOR ROLLERS

BACKGROUND OF THE INVENTION

Bearing failure or an excessive rate of wear has been a continuing problem in conveyors where the roller shafts are seated in holes formed through the conveyor frame. This arrangement is also noisy especially when looseness due to wear or bearing failure occurs. The use of conventional bearing products such as sleeve, roller or ball bearings to reduce this problem are too expensive to be practical.

Another problem has been that of mounting the conveyor rollers at an oblique angle to the side frame members. The result is a conveyor having its rollers skewed sometimes at a substantial angle to the side frame members. This arrangement is used for various purposes in the conveyor art such as to cause all the articles to shift to one side of the conveyor.

Supporting skewed rollers has been a continuing problem. In some cases, the side frame members have been drilled or bored to provide openings aligned with the shafts of the rollers rather than with the plane of the side frame members. This is both expensive and unsatisfactory. The use of bearings having mounting flanges turned at an oblique angle is prohibitively expensive. Further, all of the various devices used for this purpose have been static, that is, non-adjustable for various angles. Therefore, no adjustment for variations in the angular relationship between the axis of the rollers and the frame members has been possible. These problems have made skewed roller conveyors expensive and have discouraged their use.

BRIEF DESCRIPTION OF THE INVENTION

The invention provides a pillar or bearing block at each end of the shaft supporting each of the rollers. The blocks are supported on a horizontal surface such as a flange of the conveyor frame and are equipped with a pair of axially aligned stud shafts or spindles which project from the top and bottom of the block. The lower one of these spindles is seated in a suitable hold in the supporting flange and the upper one projects into a suitable hole in a capping flange which extends over the top of the block. Each block has an opening extending generally parallel to the flange to receive and provide an elongated support for the end of a roller shaft. The bearing block is rotatable or pivotable about the spindles whereby it may be turned so that the opening in the block is aligned with the shaft of the roller and, thus, is adjustable to the angular relationship between the roller and the frame. In this manner, the precise angular relationship between the frame and the roller is irrelevant since it is freely adjustable.

BRIEF DESCRIPTION OF THE DRAWINGS

FIG. 1 is a fragmentary plan view of a conveyor equipped with skewed rollers; and FIG. 2 is a fragmentary enlarged plan view of a conveyor frame equipped with this invention for mounting the rollers; and FIG. 3 is a fragmentary sectional view taken along the plane III—III of FIG. 2; and FIG. 4 is a sectional elevational view taken along the plane IV—IV of FIG. 2; and FIG. 5 is an exploded view of one of the bearing blocks; and FIG. 6 is a sectional view taken along the plane VI—VI of FIG. 5 (cross-hatching omitted for clarity); and FIG. 7 is a sectional view similar to FIG. 4 illustrating a modified construction for the invention.

DESCRIPTION OF THE PREFERRED EMBODIMENT

The numeral 10 refers to a conveyor having a pair of side frame members 11 which support article conveying rollers 12 positioned between them. Each of the rollers is supported on each end by a shaft 13. So far as this invention is concerned, it is irrelevant whether the shaft extends the entire length of the roller of consists of a pair of stud shafts, one on each end. Also, so far as this invention is concerned it is not relevant whether the rollers are driven or gravity. In the case of the rollers illustrated, they are driven by a belt 14.

Referring to FIG. 4, it will be seen that the conveyor frame 11 has an upper flange 20 which, as illustrated, projects inwardly. While the inwardly turned flange is a preferred construction, for the purpose of this invention, it is not relevant whether the flange projects inwardly or outwardly. Seated on top of the flange 20 are a plurality of bearing blocks 21. Each of the bearing blocks consists of an upper portion 22 and a lower portion 23, which are separated along a plane 24 parallel with the top surface of the flange 20 and basically midway between the top and bottom of the block 21. An opening 25 extends through the block, centered about the separation plane 24 and parallel to the flange 20. The opening 25 is of a size and shape to receive the end of one of the roller shafts. In the particular construction illustrated, the shaft is hexogonal and, therefore, the opening 25 is hexagonal. Since the opening 25 is centered about the separation plane 24, one half of the opening will be formed in each of the upper and lower portions of the block.

A pivot stub or spindle projects vertically from each of the halves of the block forming an upper spindle 26 and a lower spindle 27. These are aligned and concentric with the central vertical axis of the block. The lower spindle 27 is received in a suitable opening 28 in the flange 20. The upper spindle is received in a suitable opening 29 in the horizontal flange portion 30 of the cap member 31.

The cap member 31 has a vertical leg 32 extending downwardly and seating against the exterior face of the side frame member where it is secured by a bolt 33. The cap member 31 is further secured to the frame by means of vertical bolts 40 (FIGS. 2 and 3). The bolts 40 preferably engage weld nuts 41 on the flange 20. The bolts 40 provide a vertical tie between the cap member 21 and flange 20. By the amount of tightening applied to the bolts, it is possible to adjust the degree to which the flange and the cap member are squeezed against the bearing blocks 21 and, thus, to control the amount of force necessary to pivot the bearing blocks 21 about their spindles. In fact, the bearing blocks can be left largely free while the conveyor is being assembled. When all of the rollers have been properly adjusted to the desired angular relationship to the side frame members, the bolts 40 can be tightened to lock the bearing blocks in place. It will be observed from FIGS. 5 and 6 that the upper and lower halves of the bearing blocks are positively located with respect to each other by index pins. One index pin 42 being secured to the lower bearing block and a second index pin 43 being secured in the upper bearing block. Each is designed to engage a suitable opening in the opposite bearing block. This arrangement prevents inadvertent misalignment of one half of the bearing block from the other half.

While the bearing blocks may be made of any suitable material, a preferred material is a synthetic resin. For example, the bearing blocks can be molded from Surlyn 1554, an electrically conductive resin sold by E. I. Dupont de Nemoirs Co. An electrically conductive material is preferred to effect discharge of the static charge which would otherwise build up on the rollers. Under hazardous conditions, this could be serious. Another suitable material for the bearing blocks is a high strength nylon with carbon black and an inorganic filler. This provides both electrical conductivity and a low enough durometer that the bearing provides an effective vibration dampener. This in turn reduces operating noise.

While the invention can be assembled in any one of a number of ways, one simple method of assembly would be to place the lower half 23 of the bearings blocks on the flanges 20 of each of the side frame members. The rollers are then installed by simply seating the ends of the roller axles in the lower halves of the openings 25 which are exposed in the tops of the lower bearing block halves. To align the openings and the axles it is only necessary to pivot the blocks about their spindles. When the rollers have been seated, the upper half of each bearing block is installed by aligning the index pins 42 and 43 of each block and seating the upper half of the block. The cap member can then be installed seating the upper spindles 26 of the several bearing blocks in the openings 24. The bolts 33 can be loosely installed and then the bolts 40 installed and tightened to the degree desired to restrict pivotal movement of the blocks about the spindles 26 and 27. When this has been done, the bolts 33 can be tightened. It will be seen that the angular relationship of the roller shafts to the side frame members becomes irrelevant because the blocks permit quick and easy adjustment to be made for any particular angular relationship. Whether or not the rollers are skewed with respect to the frame, tightening the bolts 40 will cause the bearing blocks to firmly clamp the roller shafts eliminating any wear due to movement of the shafts within the openings 25.

It will be recognized that the cap members could be individual pieces for each bearing block. In this case, all clamping effect would be by tightening the bolt 33. However, the preferred construction is that of using an elongated capping strip which spans a plurality of the bearing blocks as illustrated.

The invention provides a noise dampening, enlarged bearing area support for the roller shafts. Because of the increased bearing area, the wear resulting from bearing failure common to installations in which the shafts are installed in openings punched or drilled in the webs of the frame members is eliminated. The invention provides a large, elongated bearing area for the shafts thus reducing unit bearing loads. Further, because the bearing blocks 21 clamp the ends of the shafts, the wear generating movement common to conventional constructions is eliminated. Because the invention eliminates metal to metal contact in the roller mounts the bearing effects significant noise suppression. The material reduction in wear further reduces noise. Thus, the invention is advantageous not only for skewed roller installations but also for installations in which the rollers are perpendicular to the supporting frame members.

Thus, while the invention is illustrated and described as applied to a skewed roller conveyor, it has many advantages in conveyors in which the roller axes are normal to the frame members. In this latter case the bearing blocks preferably should be capable of pivoting when being installed, but this is not essential.

FIG. 7 illustrates a modification for conveyors in which the side frame 11a has no horizontal flange or the flange is turned outwardly and for some reason cannot be used to support the bearing blocks. In this case, a subassembly 50 is formed by using one of the cap strips 31 together with a shelf strip 51 which has a horizontal flange 52. The flange 52 of the shelf strip is equipped with openings 53 to receive the lower spindle on the bearing blocks. The cap strip and shelf strip are assembled with the bearing blocks 21 between them and the strips are secured together by bolts similar to the bolts 40. These can then be mounted on the ends of the roller shafts and the entire assembly 50 secured to the side rail or frame member 11a by bolts 54. This arrangement permits a conventional conveyor frame to be converted to use of the bearing blocks in an area where skewed rollers are to be used. It will be seen that this variation in structure does not depart from the principles of the invention.

It will be understood that a preferred embodiment of the invention has been illustrated and described and that various modifications can be made without departing from the principle of the invention. Such modifications are to be considered as included in the hereinafter appended claims unless these claims by their language expressly state otherwise.

The embodiments of the invention in which an exclusive property or privilege is claimed are defined as follows:

1. In a conveyor having a pair of side frame members and rollers mounted therebetween, the axes of said rollers being skewed with respect to said frame members, a support shaft projecting from each end of each of said rollers, the improvement in said conveyor comprising: a bearing member at each end of each of said rollers, each of said bearing members having parallel planar upper and lower surfaces each of said bearing members having a generally horizontal opening therein receiving one of said support shafts; a generally horizontal flange on each of said frame members; the lower surfaces of said bearing members being seated on said flanges; a cap member secured to each of said frame members, each cap member having a generally horizontal leg seated over and engaging the upper surfaces of said bearing members; pivot means substantially centered with respect to each of said bearing members securing said bearing members to both said flange and said leg for rotation about a vertical axis whereby said bearing members may be rotated in a horizontal plane to adjust to the angular relationship between said frame members and the shaft of said rollers.

2. Support means as described in claim 1 wherein said bearing blocks, each having two portions which are separable about a plane parallel with the flange and substantially coincident with the centerline of the shaft opening.

3. Support means as described in claim 2 wherein said portions have index means consisting of male and female interfitting elements for holding said portions against displacement with respect to each other about said plane of separation.

4. Support means as described in claim 2 wherein said pivot means comprises a pair of aligned spindles and spindle receiving openings, one of said openings and spindles being on said bearing block.

5. Support means as described in claim 2 wherein said pivot means includes a pair of aligned spindles one projecting form each of said portions, a spindle receiving opening in said leg of said cap member and a spindle receiving opening in said flange aligned therewith.

6. Support means as described in claim 2 wherein said cap member is generally L-shaped in cross-section and has a second leg seated against said frame member; said cap member being elongated and seating over a plurality of said bearing blocks.

7. Support means as described in claim 6 wherein said means are bolts interspersed between said bearing blocks and extending through said flange and said leg portion of said cap member.

8. A conveyor as described in claim 6 wherein means are provided for forcing said flanges toward each other for controlling the resistance of said bearing blocks to rotation about said pivots and clamping the roller axles.

* * * * *